(12) United States Patent
Kobayashi

(10) Patent No.: US 8,156,257 B2
(45) Date of Patent: Apr. 10, 2012

(54) REMOVEABLE MEDIUM, FORMATTING DEVICE, FORMATTING SYSTEM, FORMATTING METHOD, AND FORMATTING PROGRAM

(75) Inventor: Yutaka Kobayashi, Yokohama (JP)

(73) Assignee: Panasonic Corporation, Osaka (JP)

( * ) Notice: Subject to any disclaimer, the term of this patent is extended or adjusted under 35 U.S.C. 154(b) by 72 days.

(21) Appl. No.: 12/672,410

(22) PCT Filed: Aug. 10, 2007

(86) PCT No.: PCT/JP2007/065750
§ 371 (c)(1),
(2), (4) Date: Feb. 5, 2010

(87) PCT Pub. No.: WO2009/022388
PCT Pub. Date: Feb. 19, 2009

(65) Prior Publication Data
US 2011/0125933 A1    May 26, 2011

(51) Int. Cl.
*G06F 3/00* (2006.01)
*H04M 1/24* (2006.01)

(52) U.S. Cl. .......................... 710/13; 379/33

(58) Field of Classification Search ...... 710/13
See application file for complete search history.

(56) References Cited

U.S. PATENT DOCUMENTS

| 7,039,754 | B2 | 5/2006 | Sasaki | |
|---|---|---|---|---|
| 2003/0120674 | A1* | 6/2003 | Morita et al. | 707/100 |
| 2006/0282653 | A1* | 12/2006 | Chu et al. | 713/1 |
| 2009/0083477 | A1* | 3/2009 | Lee et al. | 711/103 |

FOREIGN PATENT DOCUMENTS

| JP | 09-035018 | A | 2/1997 |
|---|---|---|---|
| JP | 2001-142761 | A | 5/2001 |
| JP | 2003-308241 | A | 10/2003 |
| JP | 2005-050412 | A | 2/2005 |
| JP | 2006-350703 | A | 12/2006 |

OTHER PUBLICATIONS

International Search Report mailed Oct. 2, 2007, in corresponding International Application No. PCT/JP2007/065750.

* cited by examiner

*Primary Examiner* — Henry Tsai
*Assistant Examiner* — Juanito Borromeo
(74) *Attorney, Agent, or Firm* — Seed IP Law Group PLLC

(57) ABSTRACT

A removable medium capable of performing formatting conforming to the standard if a host machine does not include a special formatting command is provided.

A removable medium has an information storage section 20 having a first storage area for storing first management information and a second storage area for storing second management information; a formatting information storage section 30 for storing formatting information to format the first storage area and the second storage area; a formatting start detection section 11 for detecting update access to update the first management information from an external machine; and a format processing section 12 for performing format processing of storing the formatting information stored in the formatting information storage section 30 in the first storage area and the second storage area as the first management information and the second management information when the update access is detected.

13 Claims, 3 Drawing Sheets

REMOVEABLE MEDIUM, FORMATTING DEVICE, FORMATTING SYSTEM, FORMATTING METHOD, AND FORMATTING PROGRAM

TECHNICAL FIELD

This invention relates to a removable medium including nonvolatile semiconductor memory and placed detachably in a host machine and a formatting device, a formatting system, a formatting method, and a formatting program of the removable medium.

BACKGROUND ART

To record data in external storage of a personal computer (PC), a mobile information terminal (PDA), a mobile telephone, etc., a removable medium of a portable memory card of an SD card, a memory stick, etc., made of nonvolatile semiconductor memory is widely used. Such a removable medium is formed with an area to record data for accessing and managing each file by formatting in a storage area like a hard disk, a floppy (registered trademark), disk, etc.

Formatting usually is performed conforming to the format standard determined considering the characteristic and the storage capacity of a removable medium. However, formatting performed by an operating system (OS) adopted for a personal computer, a mobile information terminal, etc., does not consider the characteristic of a removable medium. Thus, to format a removable medium in a host machine of a personal computer, a mobile information terminal, etc., formatting data and a formatting program need to be provided individually corresponding to the characteristic and the storage capacity of the removable medium. This puts a load on a host machine, particularly a small machine of a mobile information terminal, etc.

To solve the problem, hitherto, there has been an example wherein when an initialization command is sent from a host machine to a removable medium, formatting is performed in response to the formatting data stored in a system information storage section (for example, refer to Patent Document 1). There has also been an example wherein ROM previously storing data to be written at the formatting time and formatting information of a write position, etc., is provided and upon reception of a formatting instruction from a host machine, the formatting information is read from the ROM and formatting is performed (for example, refer to Patent Document 2).
Patent document 1: JP-A-2003-308241
Patent document 2: JP-A-2001-142761

DISCLOSURE OF THE INVENTION

Problems to be Solved by the Invention

However, in the conventional removable medium described above, to format the medium, a dedicated initialization command or formatting instruction needs to be transmitted from the host machine to the removable medium. Thus, the host machine needs a function to generate and transmit the command or instruction and a host machine not including the function cannot perform formatting considering the characteristic of the removable medium.

In view of the circumstances described above, it is an object of the invention to provide a removable medium, a formatting device, a formatting system, a formatting method, and a formatting program capable of performing formatting considering the characteristic of the removable medium if a host machine does not include a special formatting command.

Means for Solving the Problems

To accomplish the object, a first removable medium of the invention has an information storage section having a first storage area for storing first management information and a second storage area for storing second management information; a formatting information storage section for storing formatting information to format the first storage area and the second storage area; an update access detection section for detecting update access to update the first management information from an external machine; and a format processing section for performing format processing of storing the formatting information stored in the formatting information storage section in the first storage area and the second storage area as the first management information and the second management information when the update access is detected.

According to the configuration, if the host machine does not include a special formatting command, formatting conforming to the standard and formatting fitted to the device characteristic can be performed.

In the second removable medium of the invention, the format processing section performs the format processing if update information based on update access from the external machine and update information contained in the formatting information differ.

According to the configuration, if the host machine can perform formatting conforming to the standard of the removable medium and formatting fitted to the device characteristic, formatting by the host machine rather than formatting based on the formatting information previously stored in the removable medium can be performed.

In the third removable medium of the invention, if the update access is detected, the update access detection section cancels detection of different update access from the external machine.

According to the configuration, repetitive execution of format processing can be prevented.

The fourth removable medium of the invention further has a connection detection section for detecting connection of the removable medium to the external machine, wherein if connection to the external machine is detected, the update access detection section releases canceling of detection of different update access from the external machine.

According to the configuration, the external machine of a PC, etc., can recognize the format of the removable medium. The external machine recognizes that the removable medium is subjected to format processing according to the formatting information included in the external machine. Then, for example, if the removable disk is removed from the external machine, the information before the formatting is flashed and when the removable disk is again inserted into the external machine, power is again turned on, and the external machine recognizes that new removable disk has been connected. Accordingly, the format conforming to the standard of the removable disk and the format fitted to the device characteristic can be recognized.

In the fifth removable medium of the invention, the format processing section performs the format processing based on an FAT (File Allocation Table) file system.

According to the configuration, if the host machine does not include a formatting command fitted to the FAT file system, formatting conforming to the standard and formatting fitted to the device characteristic can be performed.

In the sixth removable medium of the invention, the update access is write access for writing data or erasure access for erasing data.

According to the configuration, if the host machine does not include a special formatting command, write access, erasure access is detected, whereby formatting conforming to the standard and formatting fitted to the device characteristic can be performed.

In the seventh removable medium of the invention, the first area of the information storage section has a master boot record and partition table, a reserved area, and a partition boot sector.

According to the configuration, write access, etc., from the external machine to the area between the top address of the information storage section and the last address of the partition boot sector, whereby formatting conforming to the standard and formatting fitted to the device characteristic can be performed.

In the eighth removable medium of the invention, the format processing section performs the format processing if the update access is other than update access for updating a volume ID number and a volume label contained in the master boot record and partition table.

According to the configuration, write access, etc., to the volume ID number and the volume label is made, format processing can be skipped.

In the ninth removable medium of the invention, the second area of the information storage section has a file allocation table and a root directory entry.

According to the method, if the host machine does not include a special formatting command, formatting conforming to the standard and formatting fitted to the device characteristic can be performed.

A first formatting device of the invention has an information storage section having a first storage area for storing first management information and a second storage area for storing second management information; a formatting information storage section for storing formatting information to format the first storage area and the second storage area; an update access detection section for detecting update access to update the first management information from an external machine; and a format processing section for performing format processing of storing the formatting information stored in the formatting information storage section in the first storage area and the second storage area as the first management information and the second management information when the update access is detected.

According to the configuration, if the host machine does not include a special formatting command, formatting conforming to the standard and formatting fitted to the device characteristic can be performed.

A first formatting system of the invention is a formatting system made up of an electronic machine and a removable medium connected to the electronic machine, wherein the removable medium has an information storage section having a first storage area for storing first management information and a second storage area for storing second management information; a formatting information storage section for storing formatting information to format the first storage area and the second storage area; an update access detection section for detecting update access to update the first management information from the electronic machine; and a format processing section for performing format processing of storing the formatting information stored in the formatting information storage section in the first storage area and the second storage area as the first management information and the second management information when the update access is detected.

According to the configuration, if the electronic machine of the host machine does not include a special formatting command, formatting conforming to the standard and formatting fitted to the device characteristic can be performed.

A first formatting method of the invention is a method having an information storage step of storing first management information in a first storage area and storing second management information in a second storage area; a formatting information storage step of storing formatting information to format the first storage area and the second storage area; an update access detection step of detecting update access to update the first management information from an external machine; and a format processing step of performing format processing of storing the formatting information stored in the formatting information storage section in the first storage area and the second storage area as the first management information and the second management information when the update access is detected.

According to the method, if the host machine does not include a special formatting command, formatting conforming to the standard and formatting fitted to the device characteristic can be performed.

A program of the removable medium of the invention is a program for causing a computer to execute the steps of the formatting method described above.

According to the program, if the host machine does not include a special formatting command, formatting conforming to the standard and formatting fitted to the device characteristic can be performed.

Advantages of the Invention

According to the invention, there can be provided a removable medium, a formatting device, a formatting system, a formatting method, and a formatting program capable of performing formatting conforming to the standard and formatting fitted to the device characteristic if the host machine does not include a special formatting command.

DESCRIPTION OF REFERENCE NUMERALS

1 Removable medium
10 Controller
11 Formatting start detection section
12 Format processing section
20 Information storage section
30 Formatting information storage section

BEST MODE FOR CARRYING OUT THE INVENTION

Figure 1:
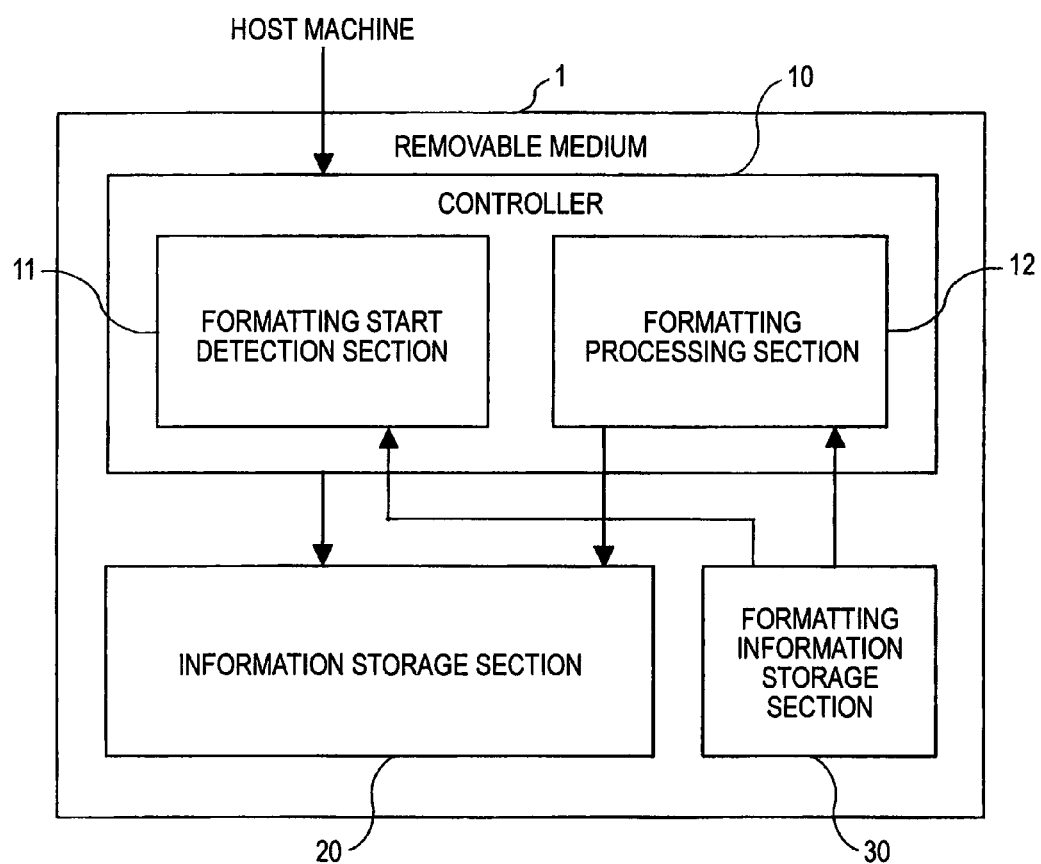
FIG. 1 is a diagram to show an example of the schematic configuration of a removable medium according to an embodiment of the invention.

A removable medium, a removable medium formatting device, a formatting method, and a formatting program according to an embodiment of the invention will be discussed below with reference to the accompanying drawings:

FIG. 1 is a block diagram to show an example of the schematic configuration of a removable medium 1 according to an embodiment of the invention.

In FIG. 1, the removable medium 1 is made up of a controller 10, an information storage section 20, and a formatting information storage section 30. The removable medium 1 is an example of a formatting device and a formatting method is realized by the formatting device.

The controller 10 is implemented as a computer system made up of a CPU, RAM, ROM, etc., and controls read and write of data transferred between the removable medium and a host machine from and into the information storage section 20 in accordance with a program. The controller 10 is made up of a formatting start detection section 11 for detecting a formatting start instruction sent from the host machine and a format processing section 12 for performing format processing for the information storage section 20 based on formatting information stored in the formatting information storage section 30.

The controller 10 has a function as "connection detection section." The formatting start detection section 11 has a function as "update access detection section."

The information storage section 20 is implemented as nonvolatile semiconductor memory where data can be electrically rewritten and erased, and is accessed in accordance with the format of an FAT (File Allocation Table) file system and stores data.

Figure 2:
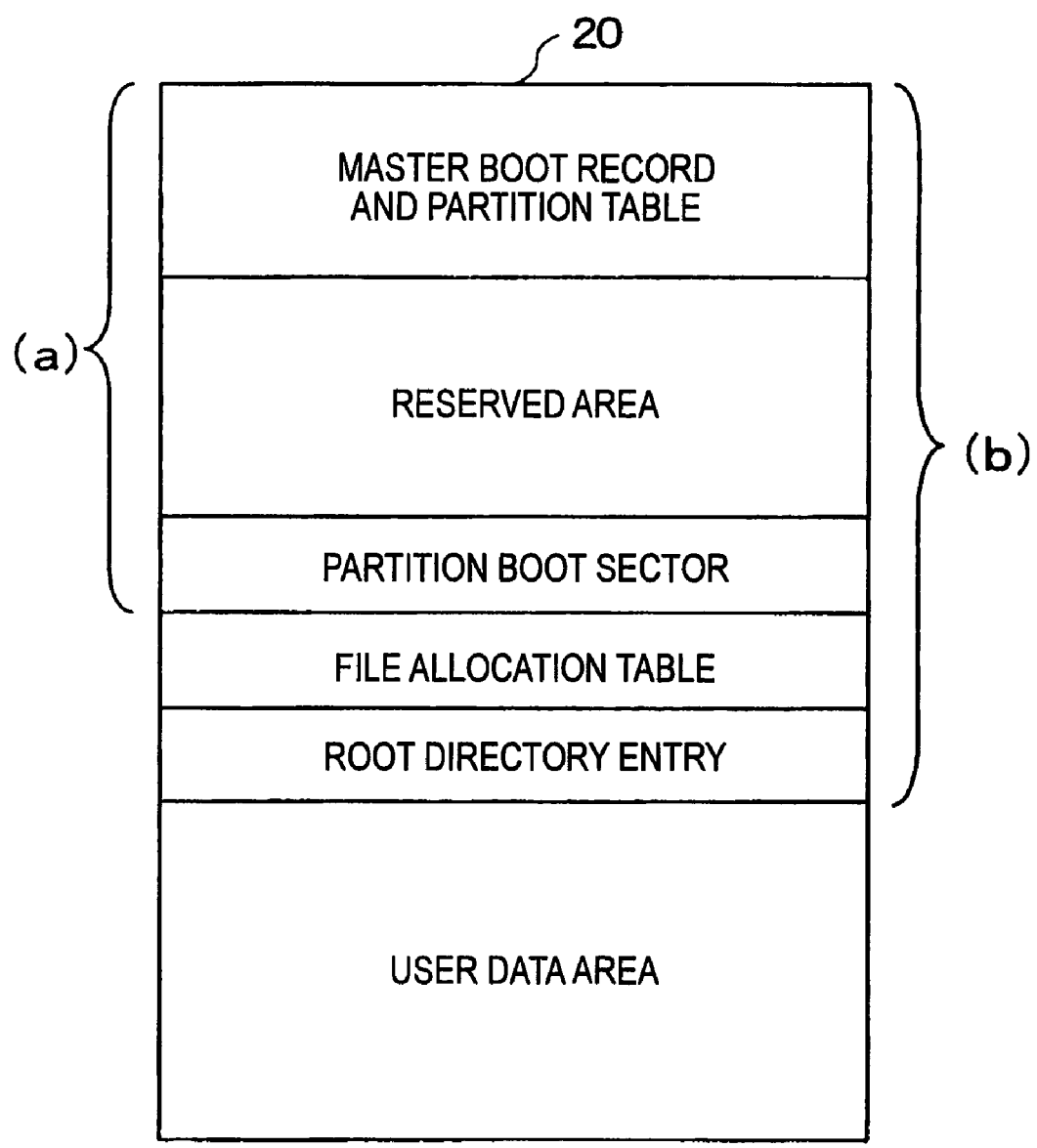
FIG. 2 is a schematic drawing to show an example of an information record section of the removable medium according to the embodiment of the invention.

FIG. 2 is a schematic drawing to show an example of the format of the information storage section 20.

As shown in FIG. 2, the information storage section 20 is made up of a master boot record & partition table describing start information of information concerning a partition and a label for causing the host machine to recognize the subsequent area and the like, a reserved area for recording file management information of a file in a directory when a new directory is created, a partition boot sector for storing information of the storage capacity, the access unit, etc., a file allocation table (FAT) for storing address information of user data, a root directory entry for storing directory configuration information, and a user data area for storing user data in order from the top address.

The formatting information storage section 30 previously stores the data in an area (b) from the master boot record & partition table to the root directory entry shown in FIG. 2 as formatting information. When the format processing section 12 performs format processing, the stored data is written into the area (b) of the information storage section 20.

Figure 3:
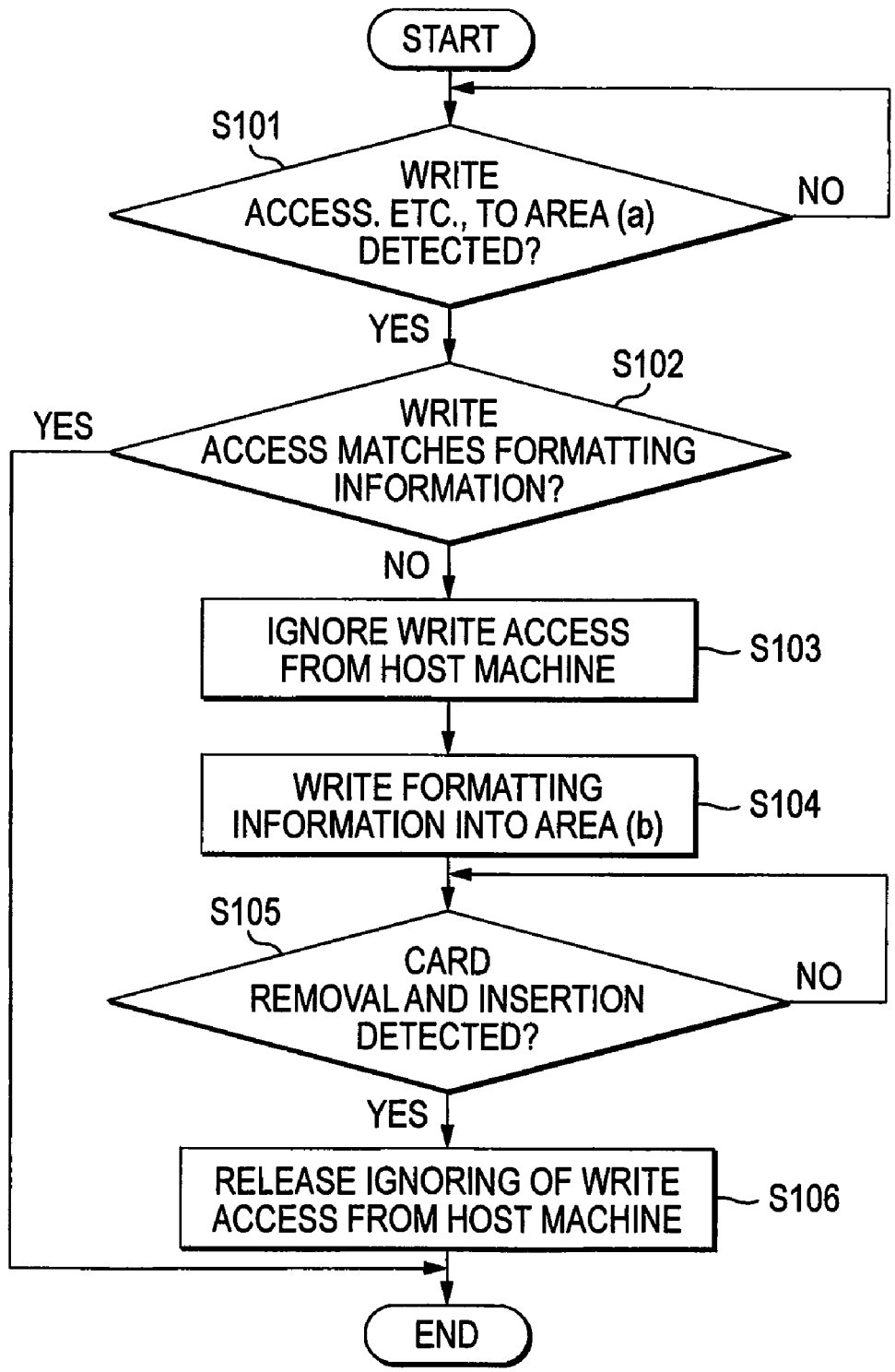
FIG. 3 is a flowchart to describe an example of a format processing procedure of the removable medium according to the embodiment of the invention.

Next, a formatting method of the described removable medium 1 will be discussed. FIG. 3 is a flowchart to describe an example of a format processing procedure of the removable medium 1.

First, the formatting start detection section 11 of the controller 1 determines whether or not the host machine makes write access (write access) or erasure access (erase access) to an area (a) from the master boot record & partition table to the partition boot sector of the information storage section 20 shown in FIG. 2 (step S101). Accordingly, it can be detected that the host machine starts format processing.

When the host machine made write access or erasure access to the volume ID number and the volume label contained in the partition boot sector of the information storage section 20, the case is excluded from formatting start from the host machine.

If formatting start from the host machine is detected as a result of the determination at step S101, the controller 11 reads the formatting information stored in the formatting information storage section 30, collates with data of write access or erasure access from the host machine, and determines whether or not they match (step S102).

If it is determined at step S102 that the write access, etc., does not match the formatting information stored in the formatting information storage section 30, it is determined that the host machine attempts to format the removable medium according to a file system not fitted to the removable medium and a processing procedure at step S103 and the later steps for performing format processing by the removable medium is executed.

On the other hand, if it is determined at step S102 that the data of the write access matches the formatting information stored in the formatting information storage section 30, it is determined that the host machine attempts to format the removable medium according to the FAT file system fitted to the removable medium and format processing by the removable medium is canceled.

Subsequently, to perform format processing by the removable medium, the controller 10 controls so as to ignore the later access from the host machine (step S103). Specifically, the controller instructs the formatting start detection section 11 not to detect any other (second or later) write access, etc., than the write access, etc., detected at step S101.

Subsequently, the format processing section 12 reads the formatting information stored in the formatting information storage section 30 and writes the formatting information into the area (b) from the master boot record & partition table to the root directory entry of the information storage section 20 shown in FIG. 2 (step S104). Accordingly, the format processing of the information storage section 20 is executed.

Subsequently, the controller 10 detects whether or not the removable medium has been removed and inserted from and into the host machine (step S105).

If it is detected that the removable medium has been removed and inserted as a result of the determination, access ignoring from the host machine is released (step S106). Accordingly, it is made possible to accept access from the host machine.

At step S103, write access, etc., from the host machine may be ignored without checking whether or not write access, etc., matches the formatting information at step S102 after write access or erasure access to the area (a) is detected at step S101. Step S102 is thus skipped, whereby format processing can always be performed if there is a command from the host machine.

The steps described above are controlled by the CPU of the controller 10 in accordance with a program (formatting program).

The removable medium is removed and inserted by the user after completion of format processing of the host machine. At this time, format processing by the removable medium is already complete.

The host machine determines that new removable medium has been attached as power supply is turned on and off by removing and inserting the removable medium, and can recognize the format of the new removable medium.

As described above, according to the removable medium 1, in the removable medium 1 made up of the controller 10, the information storage section 20, and the formatting information storage section 30, it is detected that the host machine made write access to between the top address of the information storage section 20 and the last address of the partition boot sector, whereby it is determined that the host machine starts format processing, and the later write access from the host machine is ignored. The formatting information previously stored in the formatting information storage section 30 is written into the area from the top address of the information storage section 20 to the root directory entry, whereby formatting conforming to the format standard is executed. Further, after completion of the format processing of the host machine, the removable medium is removed and inserted, whereby write access ignoring from the host machine is released.

Accordingly, if the host machine attempts to execute formatting not conforming to the standard of the removable medium, the removable medium can perform formatting conforming to the standard.

Further, the formatting information fitted to the device characteristic of the information storage section 20 of the removable medium 1 is stored in the formatting information storage section 30, so that it is also made possible to perform formatting fitted to the device characteristic of the information storage section 20 of the removable medium 1.

INDUSTRIAL APPLICABILITY

The invention is useful for a removable medium of a portable memory card of an SD card, a memory stick, etc., a formatting device, a formatting system, etc., and further a formatting program, etc., capable of performing formatting conforming to the standard and formatting fitted to the device characteristic if the host machine does not include a special formatting command.

The invention claimed is:

1. An information storage device, comprising:
an information storage section;
a formatting information section configured to store formatting information of the information storage device; and
a controller configured to control read and write access to the information storage section and including:
a formatting detection section configured to detect an attempt by an external machine to format the information storage section and to determine a file system format of the attempt; and
a format processing section configured to:
determine whether the file system format of the attempt is compatible with the information storage device based on formatting information stored in the formatting information section; and
when the file system format of the attempt is not compatible with the information storage device, prohibit the external machine from formatting the information storage section and format the information storage section based on the formatting information stored in the formatting information section.

2. The information storage device as claimed in claim 1 wherein the format processing section is further configured to allow the external machine to format the information storage section when the file system format of the attempt is compatible with the information storage device.

3. The information storage device as claimed in claim 1 wherein the format processing section is further configured to, when the file system format of the attempt is not compatible with the information storage device, ignore write accesses and erase accesses from the external machine which are indicative of an attempt to format the removable information storage device.

4. The information storage device as claimed in claim 3 wherein
the format processing section is further configured to detect removal and insertion of the information storage device, and when removal and insertion of the information storage device is detected, release ignoring of the write accesses and the erase accesses from the external machine.

5. The information storage device as claimed in claim 1 wherein
the formatting information section stores formatting information compatible with a File Allocation Table (FAT) file system.

6. The information storage device as claimed in claim 1 wherein
the information storage section has a specific area configured to store information used to access other areas of the information storage section; and
the formatting detection section is configured to detect the attempt to format based on at least one of a write access and an erase access by the external machine to the specific area.

7. The information storage device as claimed in claim 6 wherein
the specific area stores a master boot record and partition table, a reserved area, and a partition boot sector.

8. The information storage device as claimed in claim 7 wherein
the specific area is configured to store a volume ID number and a volume label as parts of the master boot record and partition table; and
the formatting detection section is configured to treat an access limited to updating at least one of the volume ID number and the master boot record as not being an attempt to format the information storage section.

9. The information storage device as claimed in claim 6 wherein
the information storage section has an area for storing a file allocation table and a root directory entry, and an area for storing user data.

10. The information storage device according to claim 1 wherein the information storage device is a removable medium.

11. A system comprising:
an electronic machine; and
a removable storage device configured to couple to said electronic machine, the removable storage device including:
an information storage section;
a formatting information section configured to store formatting information of the removable storage device; and
a controller configured to control read and write access to the information storage section and having:
a formatting detection section configured to detect an attempt by the electronic machine to format the information storage section and to determine a file system format of the attempt; and
a format processing section configured to:
determine whether the file system format of the attempt is compatible with the removeable storage device based on formatting information stored in the formatting information section; and
when the file system format of the attempt is not compatible with the removeable storage device, prohibit the electronic machine from formatting the information storage section and format the information storage section based on the formatting information stored in the formatting information section.

12. A method, comprising:
controlling formatting of a removeable storage device by,
- detecting an attempt by an external machine to format an information storage section of the removeable storage device;
- determining file system format information of the attempt;
- determining whether a file system format of the attempt is compatible with the removeable storage device based on formatting information stored in the removeable storage device and the determined file system format information of the attempt; and
- when it is determined the file system format of the attempt is not compatible with the removeable storage device,
  - prohibiting the external machine from formatting the information storage section of the removeable storage device; and
  - formatting the information storage section according to the formatting information stored in the removeable storage device.

13. A non-transitory computer-readable memory medium whose contents cause an information storage device to perform a method, the method comprising:
- detecting an attempt by an external machine to format an information storage section of the information storage device;
- determining file system format information of the attempt;
- determining whether a file system format of the attempt is compatible with the information storage device based on formatting information stored in the information storage device and the determined file system format information of the attempt; and
- when it is determined the file system format of the attempt is not compatible with the information storage device,
  - prohibiting the external machine from formatting the information storage section of the information storage device; and
  - formatting the information storage section according to the formatting information stored in the information storage device.

* * * * *

UNITED STATES PATENT AND TRADEMARK OFFICE
CERTIFICATE OF CORRECTION

PATENT NO. : 8,156,257 B2  Page 1 of 1
APPLICATION NO. : 12/672410
DATED : April 10, 2012
INVENTOR(S) : Yutaka Kobayashi It is certified that error appears in the above-identified patent and that said Letters Patent is hereby corrected as shown below:

Item (54):
"REMOVEABLE MEDIUM, FORMATTING DEVICE, FORMATTING SYSTEM, FORMATTING METHOD, AND FORMATTING PROGRAM" should read, --REMOVABLE MEDIUM, FORMATTING DEVICE, FORMATTING SYSTEM, FORMATTING METHOD, AND FORMATTING PROGRAM--.

Item (75):
"Yutaka Kobayashi, Yokohama (JP)" should read, --Yutaka Kobayashi, Yokohama-shi (JP)--.

Column 8, Line 61:
"attempt is compatible with the removeable storage" should read, --attempt is compatible with the removable storage--.

Column 8, Line 65:
"compatible with the removeable storage device," should read, --compatible with the removable storage device,--.

Column 9, Line 5:
"controlling formatting of a removeable storage device by," should read, --controlling formatting of a removable storage device by,--.

Column 9, Line 7:
"information storage section of the removeable storage" should read, --information storage section of the removable storage--.

Signed and Sealed this
Twenty-sixth Day of June, 2012

David J. Kappos
*Director of the United States Patent and Trademark Office*

UNITED STATES PATENT AND TRADEMARK OFFICE
CERTIFICATE OF CORRECTION

PATENT NO. : 8,156,257 B2  Page 1 of 1
APPLICATION NO. : 12/672410
DATED : April 10, 2012
INVENTOR(S) : Yutaka Kobayashi It is certified that error appears in the above-identified patent and that said Letters Patent is hereby corrected as shown below:

Title Page, Item (54) and Column 1, lines 1-4, Title:
"REMOVEABLE MEDIUM, FORMATTING DEVICE, FORMATTING SYSTEM, FORMATTING METHOD, AND FORMATTING PROGRAM" should read, --REMOVABLE MEDIUM, FORMATTING DEVICE, FORMATTING SYSTEM, FORMATTING METHOD, AND FORMATTING PROGRAM--.

Title Page, Item (75) Inventors:
"Yutaka Kobayashi, Yokohama (JP)" should read, --Yutaka Kobayashi, Yokohama-shi (JP)--.

Column 8, Line 61:
"attempt is compatible with the removeable storage" should read, --attempt is compatible with the removable storage--.

Column 8, Line 65:
"compatible with the removeable storage device," should read, --compatible with the removable storage device,--.

Column 9, Line 5:
"controlling formatting of a removeable storage device by," should read, --controlling formatting of a removable storage device by,--.

Column 9, Line 7:
"information storage section of the removeable storage" should read, --information storage section of the removable storage--.

This certificate supersedes the Certificate of Correction issued June 26, 2012.

Signed and Sealed this
Thirty-first Day of July, 2012

David J. Kappos
*Director of the United States Patent and Trademark Office*

UNITED STATES PATENT AND TRADEMARK OFFICE
CERTIFICATE OF CORRECTION

PATENT NO.         : 8,156,257 B2                                Page 1 of 2
APPLICATION NO.    : 12/672410
DATED              : April 10, 2012
INVENTOR(S)        : Yutaka Kobayashi It is certified that error appears in the above-identified patent and that said Letters Patent is hereby corrected as shown below:

Title Page, Item (54) and Column 1, lines 1-4, Title:
"REMOVEABLE MEDIUM, FORMATTING DEVICE, FORMATTING SYSTEM, FORMATTING METHOD, AND FORMATTING PROGRAM" should read, --REMOVABLE MEDIUM, FORMATTING DEVICE, FORMATTING SYSTEM, FORMATTING METHOD, AND FORMATTING PROGRAM--.

Title Page Item (75) Inventors:
"Yutaka Kobayashi, Yokohama (JP)" should read, --Yutaka Kobayashi, Yokohama-shi (JP)--.

Column 8, Line 61:
"attempt is compatible with the removeable storage" should read, --attempt is compatible with the removable storage--.

Column 8, Line 65:
"compatible with the removeable storage device," should read, --compatible with the removable storage device,--.

Column 9, Line 5:
"controlling formatting of a removeable storage device by," should read, --controlling formatting of a removable storage device by,--.

Column 9, Line 7:
"information storage section of the removeable storage" should read, --information storage section of the removable storage--.

This certificate supersedes the Certificates of Correction issued June 26, 2012 and July 31, 2012.

Signed and Sealed this
Sixth Day of November, 2012

David J. Kappos
*Director of the United States Patent and Trademark Office*

CERTIFICATE OF CORRECTION (continued)
U.S. Pat. No. 8,156,257 B2

Column 9, Line 12:
"is compatible with the removeable storage device" should read, --is compatible with the removable storage device--.

Column 9, Line 14:
"removeable storage device and the determined file" should read, --removable storage device and the determined file--.

Column 9, Line 17:
"attempt is not compatible with the removeable storage" should read, --attempt is not compatible with the removable storage--.

Column 9, Line 20:
"information storage section of the removeable storage" should read, --information storage section of the removable storage--.

Column 9, Lines 23-24:
"to the formatting information stored in the removeable storage device." should read, --to the formatting information stored in the removable storage device.--.